WAVEGUIDE WALL-CURRENT TUNNEL DIODE AMPLIFIER AND OSCILLATOR

Filed March 23, 1965

3 Sheets-Sheet 1

INVENTOR.
HORST W. A. GERLACH

BY Harry M. Saragovitz
Edward J. Kelly, Herbert Berl
& Charles L. Whitham ATTORNEYS May 16, 1967 H. W. A. GERLACH 3,320,550

WAVEGUIDE WALL-CURRENT TUNNEL DIODE AMPLIFIER AND OSCILLATOR

Filed March 23, 1965 3 Sheets-Sheet 2

INVENTOR,
HORST W. A. GERLACH

BY Harry M. Saragovitz,
Edward J. Kelly, Herbert Berl
& Charles L. Whitham ATTORNEYS

INVENTOR,
HORST W. A. GERLACH

BY Harry M. Saragovitz, Edward J. Kelly, Herbert Berl & Charles S. Whitham ATTORNEYS United States Patent Office 3,320,550

Patented May 16, 1967

3,320,550

WAVEGUIDE WALL-CURRENT TUNNEL DIODE AMPLIFIER AND OSCILLATOR

Horst W. A. Gerlach, Bethesda, Md., assignor to the United States of America as represented by the Secretary of the Army Filed Mar. 23, 1965, Ser. No. 442,217

13 Claims. (Cl. 331—96)

ABSTRACT OF THE DISCLOSURE

This disclosure describes a traveling wave amplifier that utilizes an array of tunnel diodes in one or both of the narrow sidawalls of a rectangular waveguide. The diodes are located so that each conducts a fractional part of the wall current, and when they are biased into their negative resistance regions, the diodes in effect pump microwave energy into the waveguide thereby providing fast wave amplification. By placing a shorting plate or sliding short in one open end of the waveguide a quarter wave resonator is produced converting the device into a wall current oscillator.

The invention described herein may be manufactured and used by or for the Government of the United States of America for governmental purposes without the payment to me of any royalty thereon.

This invention relates to traveling-wave devices, and more particularly to highly efficient microwave amplifiers and oscillators using negative-resistance solid-state elements.

Low noise amplification at microwave frequencies has for many years been achieved by means of vacuum-tube amplifiers. Among the most efficient vacuum-tube amplifiers at very high frequencies is the traveling-wave tube. This device employs a high voltage electron beam as a source of energy. The electron beam is made to pass in close proximity to a slow wave structure. When the phase velocity of an electromagnetic wave traveling in the slow wave structure is approximately equal to the electron velocity, energy is coupled from the electron beam to the electromagnetic wave. In order to obtain good efficiency and performance with the traveling-wave tube, it is necessary that the electron beam pass as close as possible along the length of the slow wave structure since the beam interaction with the electromagnetic wave takes place very close to the slow wave structure. Consequently, there is a great possibility that the beam current will be intercepted by the structure. To avoid this, the electron beam requires elaborate focusing, and components must be carefully aligned. Of course, the entire device must be enclosed in an evacuated envelope, and, if exposed to severe environmental conditions, costly structural modifications must be made to improve the ruggedness of the device.

Recently, microwave amplifiers using various types of solid-state devices as active elements have been developed which, in many respects, are superior to vacuum-tube amplifiers. Solid-state microwave amplifier structures have taken many forms including parametric amplifier circuits, which employ the junction capacitance of a diode as a variable reactance in the "pump," and negative-resistance devices mounted in transmission lines, cavities, and waveguides of varying configuration. All of these amplifier structures enjoy certain advantages such as a low noise figure, ability to operate at high microwave frequencies, and very low power requirements; however, these structures have the disadvantage of low maximum power output.

Microwave amplifiers which employ negative-resistance devices amplify by "negatively attenuating" the signal. Perhaps the best known negative-resistance device is the Esaki or tunnel diode. This device has a characteristic S shaped voltage-current curve for posttive voltage and current. A portion of this curve has a negative slope. Thus, if the tunnel diode is biased to operate in the region of the negative slope of the voltage-current curve, then it appears as a negative-resistance. In addition to the tunnel diode, many other two-terminal devices, which are characterized as negative-resistance diodes, are known to exhibit similar regions of negative dynamic resistance in their characteristic voltage-current curves. Such devices include the PNPN type diode and certain germanium diodes. While devices such as these can, in general, be used in praticing the present invention, for purposes of illustration only the tunnel diode will be referred to in the following descriptions.

According to the state of the art, the power generated with tunnel diodes at microwave frequencies varies from the order of a few milliwatts at C-Band to a few microwatts at X-Band. The power level and frequency limitations of tunnel diode circuits are usually determined by the geometry and current capability of the tunnel diode and the impedance match of the tunnel diode to the circuit. This latter factor is most important since, if the tunnel diode is improperly matched to the circuit, the mismatch leads to very inefficient operation of the device. It is generally known that the impedance match constitues a difficult problem and is very often nearly impossible to solve satisfactorily. If reasonable matching is achieved, usually it is at the expense of bandwidth or optimum gain or both in an amplifying device or available power output in an oscillator. In addition, attempts to provide a proper impedance match may cause parasitic oscillations which modulate and reduce the output power.

One method of increasing the power output of a microwave amplifier is to place a number of negative-resistance diodes in parallel, as is done in the applicant's invention in Traveling Wave Amplifier and Oscillator with Tunnel Diodes which is the subject of application Ser. No. 222,744, filed Sept. 10, 1962, now U. S. Patent No. 3,171,-086 issued Feb. 23, 1965 and assigned to the assignee of the present application. The invention in application Ser. No. 222,744 employs a slow-wave ladder-line structure having tunnel diodes mounted in the rungs of the structure. An increasing number of diodes are mounted in parallel in succeeding rungs in the direction of wave propagation. Since the tunnel diodes are very low impedance devices and since diodes that are connected in parallel produce a combination with a still lower impedance, it is apparent that the problem of matching the impedance of the diodes to microwave structure becomes increasingly difficult as more diodes are connected in parallel.

Another method of increasing the power output of microwave amplifiers is to connect a number of negative-resistance diodes in series. While the problem of impedance matching in a series configuration is not as acute as in a parallel configuration, the problems associated with mounting, tuning, and providing individual bias for each diode detract considerably from this method.

It is therefore an object of this invention to provide a high efficiency microwave amplifier using negative-resistance diodes.

It is another object of the present invention to provide a solid-state microwave oscillator capable of producing high output power.

It is a further object of the instant invention to provide a microwave amplifier using tunnel diodes in a microwave structure in which the problems of impedance matching between the tunnel diodes and the microwave structure are effectively overcome without compromise in bandwidth or gain.

It is yet another object of this invention to provide a high efficiency microwave oscillator using tunnel diodes which can be tuned over a considerable frequency range.

It is still another object of the invention to provide solid-state traveling-wave amplifiers and oscillators which are extremely rugged, compact and easy to build.

According to the present invention, the foregoing and other objects are attained by providing in the narrow sidewalls of a rectangular waveguide an array of negative-resistance diodes. The diodes are located in the wall current paths when the waveguide is excited in the $TE_{01}$ mode. When the diodes are biased into their negative resistance region, each diode pumps radio-frequency energy into the waveguide; and a fast wave amplification takes place in the case of an amplifier, or a standing-wave of radio-frequency energy is established in the waveguide in the case of an oscillator.

The specific nature of the invention, as well as other objects, aspects, uses and advantages thereof, will clearly appear from the following description and from the accompanying drawing, in which:

FIG. 1 is a perspective view of a segment of a microwave amplifier using tunnel diodes according to the invention and illustrates the mounting of the tunnel diodes in the waveguide;

FIG. 1*a* is a cross-sectional view showing a modification of the mounting of a tunnel diode in a waveguide which includes a radio-frequency by-pass capacitor for the bias resistor;

Figures 1, 1A:
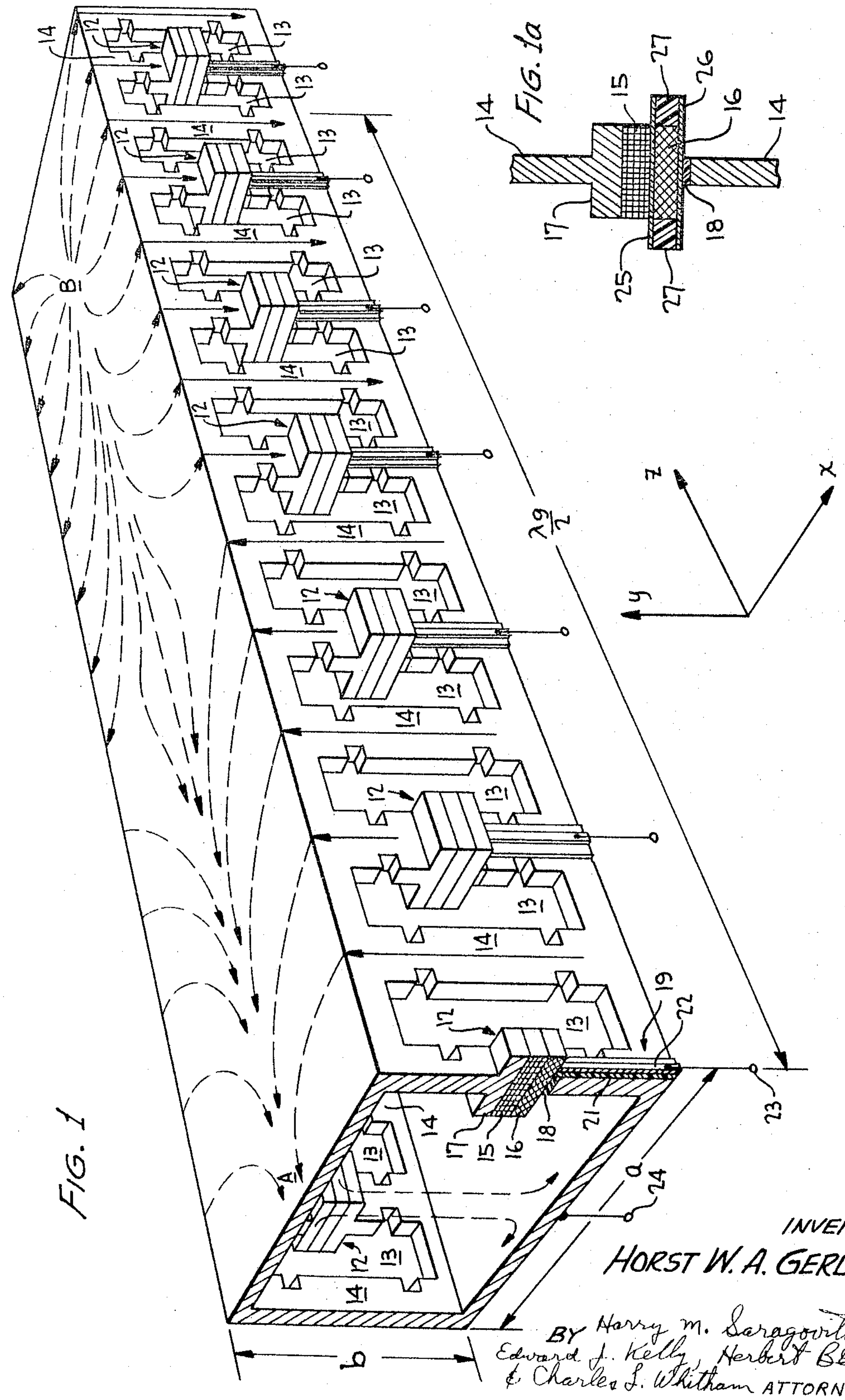
Figure 3A:
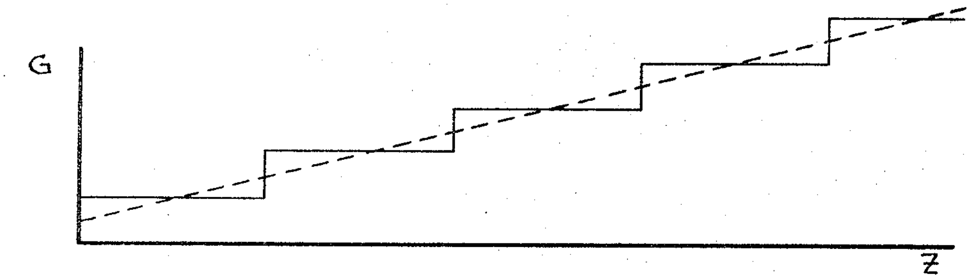
FIG. 3 is a lumped parameter equivalent circuit of the structure shown in FIGURE 1 which illustrates the chain amplification effect produced by the tunnel diode array in the sidewalls of the waveguide.
Figure 3:
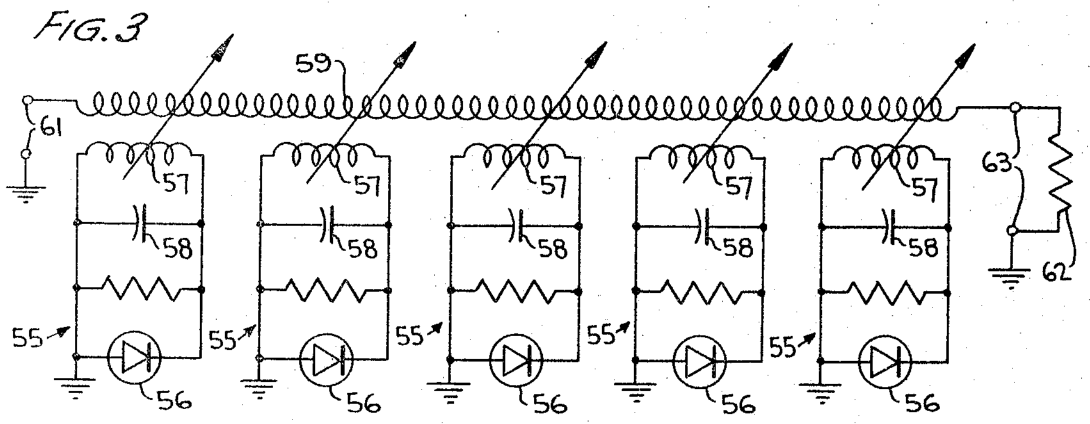
Figure 4:
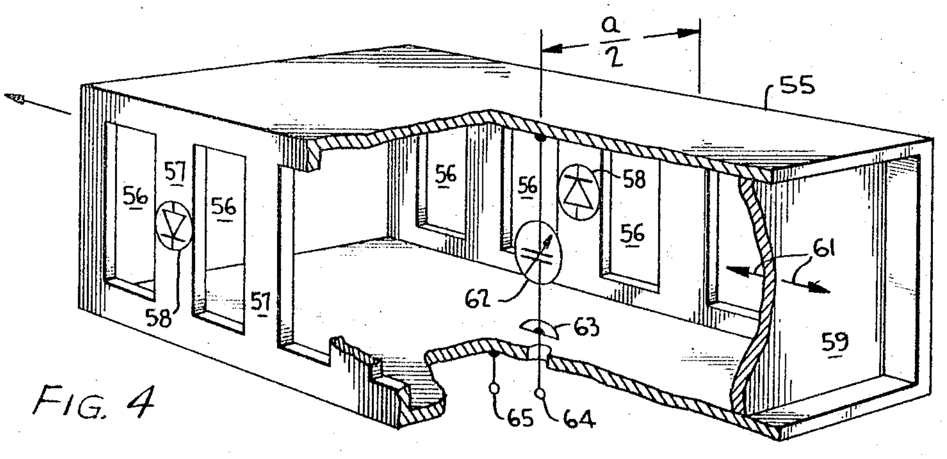

FIG. 3*a* is a graphical illustration of gain versus length of the microwave structure which shows the contribution to the gain made by each tunnel diode in the circuit shown in FIGURE 3; and FIG. 4 is a perspective view partially broken away to show a modification to the structure shown in FIGURE 1 to form a mechanically and voltage tunable microwave oscillator.

Referring now to the drawings, and more particularly to FIGURE 1 where there is shown a section of a solid-state microwave amplifier according to the invention which comprises a rectangular waveguide section 11. Waveguide section 11 has $x$ and $y$ dimensions corresponding to broad and narrow sidewall dimensions of $a$ and $b$, respectively. When radio-frequency energy is propagated in the waveguide section 11 in the $z$-direction and in the dominate $TE_{01}$ mode, radio-frequency current flows in the walls of the waveguide. The wall current distribution in the waveguide section 11 is illustrated by arrows in FIGURE 1 for one cycle of electro-magnetic oscillation of the radio-frequency energy. As shown, current flows up the narrow side walls and across the upper broad wall of a portion of the waveguide section 11 toward a current sink A, while current flows from a current source B across the upper broad wall and down the narrow side walls of another portion of the waveguide section 11. A current sink A is separated from a current source B by a distance equal to $\lambda_g/2$, where $\lambda_g$ is the wavelength of the radio-frequency energy propagating in the waveguide section 11. The arrows which appear to emanate from the current sink A in the upper broad wall of the waveguide section 11 and flow toward the lower broad wall represent the displacement current flowing between a current sink in one broad wall to an image current source in the opposite broad wall. For traveling waves, the transverse waveguide impedance $Z_{Tr}$ may be expressed as follows:

$$Z_{Tr} \approx Z_w \cdot \cos \frac{2\pi_x}{\lambda_g}$$

where $Z_W$ is the waveguide impedance and $x$ is the distance from the center of the waveguide to a point in question. From the above relation, it is evident that the narrow sidewalls, where $x$ is equal to $a/2$, are the lower impedance points in the waveguide, substantially independent of frequency. In order to obtain the best impedance match between a tunnel diode and the waveguide section, it is desirable that the tunnel diode be connected at the lowest impedance point of the waveguide section. This has been done in the present invention by fabricating a plurality of tunnel diode assemblies 12 into each of the narrow sidewalls of the waveguide section 11. As is apparent from FIGURE 1 of the drawings, each of the tunnel diode assemblies 12 is in the path of a portion of the sidewall current. When the tunnel diodes are appropriately polarized and biased into the negative-resistance regions of their voltage-current curves, this arrangement of tunnel diodes in the waveguide section 11 produces a "negative attenuation" along the direction of propagation in the waveguide. This effect is caused by amplification of the radio-frequency wall current by the tunnel diodes with a resulting amplification of the radio-frequency energy propagated in the waveguide. The configuration shown in FIGURE 1 can, therefore, be described as a chain-amplifier derived from "current-distributed" waveguide sections. Each waveguide section having a tunnel diode pumps radio-frequency energy into the waveguide, and a fast wave amplification takes place, no delay circuit being required. This may be more readily appreciated by considering a tunnel diode as a negative-admittance. Then, a section of the waveguide combined with a tunnel diode can be considered to introduce a "negative attenuation constant" per unit length into the waveguide. Thus, the propagation constant $\gamma_{TD}$ of the tunnel diode per unit length is expressed as follows:

$$\gamma_{TD} = -\alpha_{TD} + j\beta_{TD}$$

where $-\alpha_{TD}$ is the attenuation constant and $\beta_{TD}$ is the phase constant of the tunnel diode in customary complex theory notation. Similarly, the propagation constant $\gamma_W$ of an empty waveguide is expressed as follows:

$$\gamma_W = \alpha_W + j\beta_W$$

If it is assumed that both phase constants are equal, which is correct to a first approximation, then $$\beta_{TD} = \beta_W = \beta$$

The total propagation constant of a section of waveguide combined with a tunnel diode is then expressed as follows:

$$\gamma_{total} = (-\alpha_{TD} + \alpha_W) + j\beta$$

If the absolute value of the attenuation constant of the tunnel diode is greater than the absolute value of the attenuation constant of the waveguide, amplification occurs provided, of course, that both the input terminals and output terminals of the waveguide section are matched to the input signal source and the output load respectively.

The narrow sidewalls of the waveguide section 11 comprise a series of resonant windows 13 and rungs 14 with the tunnel diode assemblies 12 fabricated into every other rung. The resonant windows 13 provide radio-frequency coupling of the tunnel diode assemblies 12 to the waveguide section 11, while the rungs 14 provide paths for the sidewall currents in the waveguide. The notches shown in the rungs 14 are for the purpose of tuning the resonant windows 13. All the tunnel diodes in an array of tunnel diode assemblies 12 are polarized in the same direction, while the tunnel diodes in opposite arrays are oppositely polarized. For example, the tunnel diodes in the array in the near narrow sidewall of the waveguide section 11 may be considered to be polarized for current flow from the bottom edge of the sidewall to the top edge of the sidewall, while the tunnel diodes in the array in the opposite sidewall may be considered to be polarized for current flow from the top edge of the sidewall to the bottom edge of the sidewall. The tunnel diode array in one sidewall is spatially shifted with respect to the tunnel diode array in the opposite sidewall by a distance equal to one-half the distance between tunnel diode assemblies in an array. Thus, a rung 14 having a tunnel diode assembly 12 in one sidewall is directly opposite a rung not having a tunnel diode assembly in the opposite sidewall. During one cycle of electro-magnetic oscillation of the energy propagated in the waveguide, only one-half of the tunnel diodes between current nodes in the broad sidewalls contribute to the amplification of the wall current. This is apparent from an inspection of FIGURE 1 where it may be seen that the wall current flows in the direction of diode polarization with respect to half the diodes. On the next cycle, the flow of the wall current is reversed, and the other one-half of the tunnel diodes contribute to the amplification of the wall current. It is to be noted that the configuration of the arrays in opposite sidewalls is such that during any cycle tunnel diodes in one array which do not contribute to amplification are opposite tunnel diodes in the other array which do contribute to amplification; therefore, the amplification produced by the device shown in FIGURE 1 may be described as "full-wave" amplification. Obviously, "half-wave" amplification may be produced by a waveguide section having a tunnel diode array fabricated into only one of its narrow sidewalls. In such a structure, the resonant windows would be omitted in the narrow sidewall not having the tunnel diode array.

Each rung 14 having a tunnel diode assembly 12 fabricated therein is formed with a break that communicates with the resonant windows 13 immediately adjacent. The tunnel diode assembly 12 provides a mechanical and electrical bridge for this break so that all the current flowing in the rung 14 flows through the diode assembly. The tunnel diode assemblies 12 each comprise a tunnel diode 15 in series mechanical and electrical connection with a bias resistor 16. Tunnel diode 15 abuts and makes electrical contact with flange 17 which is integrally formed in rung 14. On the other side of the break in rung 14, bias resistor 16 is separated from rung 14 by a small block of insulative material 18 having a suitable dielectric constant. The surface of resistors 16 contacting the block of insulative material 18 and the surface of the rung 14 contacting the block of insulative material 18 thus form a capacitor in series with tunnel diode 15 and bias resistor 16. As is explained in more detail in another part of the specification, this capacitor performs the function of a direct current by-pass capacitor. It is often desirable to provide a radio-frequency by-pass capacitor across bias resistor 16 to eliminate parasitic oscillations. This is easily accomplished by the structure shown in cross-section in FIGURE 1*a*. Two thin metallic plates 25 and 26 are placed on opposite sides of the resistor 16; one between the tunnel diode 15 and the resistor 16 and one between the insulating block 18 and the resistor 16. The plates 25 and 26 overlap resistor 16, and the space between them not occupied by resistor 16 is filled with an insulating material 27 having a suitable dielectric constant. Thus, the plates 25 and 26 form the plates of a capacitor in parallel with resistor 16. Returning now to FIGURE 1, the direct-current bias connection to the tunnel diode 15 is made with a stripline 19 which runs from resistor 16 to the edge of the narrow sidewall to facilitate the connection. The stripline 19 is conventional in construction and comprises a thin strip of insulating material 21 bonded to the exterior surface of the rung 14 between resistor 16 and the edge of the sidewall. A thin strip of metal 22, such as copper, which is narrower than the strip of insulating material is bonded to the exposed surface of the insulating material 21. The strip of metal 22 is electrically connected to resistor 16 at one end and to a terminal 23 at the other end. Another terminal 24 is connected to the center of a broad wall of waveguide section 11 at a point where the radio-frequency transverse currents are zero. A source of bias voltage (not shown) is connected between terminals 23 and 24.

Figure 2:
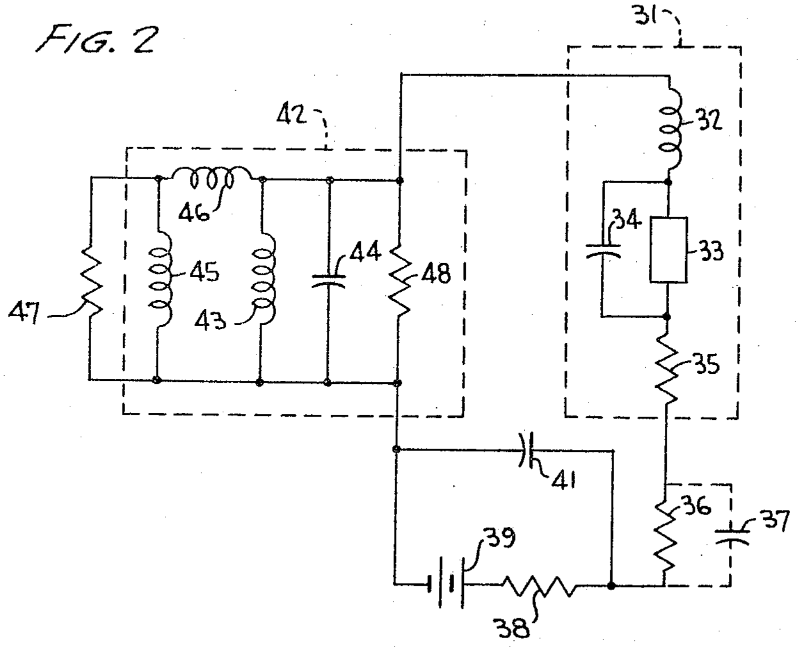
FIG. 2 is a lumped parameter equivalent circuit of a section of the structure shown in FIGURE 1 having a single tunnel diode.

The equivalent circuit of a section of waveguide with one tunnel diode taken from the device shown in FIGURE 1 is illustrated in FIGURE 2. The circuitry enclosed in the dashed box 31 is the lumped parameter equivalent circuit of the tunnel diode. This circuit includes an inductance 32 which is the inductance associated with the connections of the tunnel diode into the waveguide structure. Connected in series with inductance 32 is a negative resistance 33. Shunting resistance 33 is a capacitance 34 which is the capacitance of the tunnel diode junction. A resistance 35 is connected in series with the parallel connection of resistance 33 and capacitance 34. Resistance 35 is the resistance associated with the resistance of the semiconductor material forming the tunnel diode and the resistance of the connection of the tunnel diode into the waveguide structure.

Negative resistance 33 appears in the circuit only when the tunnel diode is biased into its negative conducting region. As is well known, a portion of the characteristic curve of a tunnel diode has a negative slope, and it is this characteristic that produces the amplification of the wall current in the waveguide. Tunnel diodes have only one stable region of operation. For operation in this stable region it is necessary that the total resistance, $R_{total}$, in the tunnel diode circuit have a value determined by the following expression:

$$\frac{1}{|G_{TD}|} > R_{total} > \frac{1}{|G_{TD}|}\left(\frac{L_{TD}}{C_{TD}}\right)$$

where $G_{TD}$ is the negative conductance of the tunnel diode, $L_{TD}$ is the inductance of the tunnel diode, $C_{TD}$ is the capacitance of the tunnel diode, and $R_{total}$ includes the bias resistance, the load resistance, and the series losses in the circuit. If $R_{total}$ should become greater than $$\frac{1}{|G_{TD}|}$$

an undesirable hysteresis effect would take place.

Returning now to FIGURE 2, a bias resistor 36 is connected in series with the tunnel diode 31. Capacitor 37 is a radio-frequency by-pass capacitor which may be connected in shunt with bias resistor 36. Connected in series with the bias resistor 36 is a source of bias voltage, here represented as a source impedance 38 and a battery 39. A direct-current by-pass capacitor 41 is connected in shunt with the source of bias voltage. To complete the circuit, the waveguide structure represented by the circuitry enclosed in the dashed box 42 is connected between the source of bias voltage and the tunnel diode 31. The waveguide structure 42 includes a parallel-resonant circuit comprising an inductance 43 and capacitance 44. This resonant circuit represents a resonant window in the waveguide wall. The energy in the resonant circuit is coupled to the inductance 45 of the waveguide proper by a mutual inductance 46. The load impedance 47 of the structure is connected in parallel with the inductance 45. Impedance 48, which is connected in parallel with the resonant circuit comprising inductance 43 and capacitance 44, represents the reflected load impedance.

The operation of the section of waveguide having a single tunnel diode can be visualized from an inspection of the circuit just described. The tunnel diode 31 is biased into its negative conductance region by the source of bias voltage comprising battery 39 and the bias resistor 36 connected in series with the tunnel diode. Radio-frequency current in the wall of the waveguide flows from the waveguide structure 42 through tunnel diode 31, radio-frequency by-pass capacitor 37, direct-current by-pass capacitor 41, and back into the waveguide structure. The amplified current pumped into the waveguide structure 42 by tunnel diode 31 is transformed into energy in the parallel-resonant circuit. This energy is coupled by mutual inductance 46 to the waveguide 45 and thence to the output load impedance 47.

An extension of the equivalent circuit illustrated in FIGURE 2 is shown in FIGURE 3 of the drawings. This circuit represents several sections 55 of waveguide each having a tunnel diode 56. Each waveguide section includes a resonant window, represented by parallel inductance 57 and capacitance 58, which is coupled to the waveguide 59. An input signal is coupled into the structure at input terminals 61 of the waveguide 59, and the resulting output signal is coupled to load impedance 62 at the waveguide output terminals 63. Amplification of the input signal is achieved by incremental increases in gain along the length of the structure as represented by the graph in FIGURE 3*a*.

If a shorting plate or sliding short is connected to one open end of the waveguide structure in the device shown in FIGURE 1, a quarter wavelength waveguide resonator is produced. By this modification, the wall current amplifier is converted into a wall current oscillator. Such a structure is illustrated in FIGURE 4. The structure comprises a rectangular waveguide section 55 having resonant windows 56 and rungs 57 in the narrow sidewalls and tunnel diode assemblies 58 fabricated into alternate rungs as before. At one end of the waveguide section 55, there is positioned a shorting plate 59. The plate 59 may be mechanically movable longitudinally within the waveguide section 55 as indicated by the double-headed arrow 61 to permit mechanical tuning of the oscillator, or it may be fixed within the waveguide section 55 as by soldering. If the shorting plate is fixed within the waveguide section 55, then tunnel diode assemblies may also be fabricated in the plate for optimum utilization of the wall currents and, hence, even more efficient operation. Because of the total reflection of the wave introduced into the resonator, the reflected wave produces feedback; and, in conjunction with the tunnel diode assemblies, oscillations at the resonant frequency are generated by means of the regenerative principle.

The wall-current oscillator can also be tuned electronically. This may be accomplished by connecting a varactor diode 62 between the broad walls of the wave guide section 55 at points equidistant between the narrow sidewalls. One terminal of varactor diode 62 is connected directly to one of the broad walls, while the other terminal is connected by way of a feed-through capacitor 63 in the opposite broad wall to a terminal 64. Capacitor 63 performs the function of a direct-current by-pass capacitor. A second terminal 65 is connected to the waveguide section 55. A source of modulation voltage (not shown) is connected between the terminals 64 and 65. As is well known, the capacitance of the junction of the varactor diode is a function of the voltage across it; therefore, the source of modulation voltage controls the capacitance of the varactor diode. The capacitance of the varactor diode in turn controls the resonant frequency of the oscillator.

As is apparent from the foregoing description, the present invention provides many advantages in solid-state amplifiers and oscillators not heretofore realized. Each tunnel diode carries only part of the radio-frequency current in the waveguide which means each tunnel diode contributes only a portion of the total power output of the device. Since each tunnel diode is only loaded to its capability, overloading is eliminated. The total radio-frequency output power is determined by the sum of the diodes employed. Very efficient operation is obtained since the impedances of the tunnel diodes are closely matched to the impedance of the waveguide structure. An amplifier constructed in accordance with the teachings of the invention is very broadband because the tunnel diode assemblies are arranged in such a way that the amplifying waveguide section appears very much as an unperturbed waveguide. In the case of an oscillator constructed in accordance with the teachings of the invention, extremely good modulation linearity is obtained. It should be understood, of course, that the foregoing relates to only preferred embodiments of the invention and that numerous modifications or alternations may be made therein without departing from the spirit and scope of the invention as set forth in the appended claims.

I claim as my invention:

1. A traveling-wave device comprising:
(a) a rectangular waveguide section having two narrow sidewalls and two broad walls; and
(b) at least one array of negative-resistance solid-state devices fabricated into a narrow sidewall of said waveguide section, each negative-resistance solid-state device of said array being positioned in said narrow sidewall to carry only a fractional portion of the total radio-frequency current flowing in said narrow sidewall when said waveguide section is excited in the dominant transverse electric mode.

2. A traveling-wave device comprising:
(a) a rectangular waveguide section having two narrow sidewalls and two broad walls, at least one of said narrow sidewalls having a series of regularly spaced resonant windows and rungs; and
(b) an array of negative-resistance solid-state devices, each negative-resistance solid-state device of said array being fabricated into a separate rung in said narrow sidewall of said waveguide section to carry only a fractional portion of the total radio-frequency current flowing in said narrow sidewall when said waveguide section is excited in the dominant transverse electric mode.

3. A traveling-wave device as recited in claim 2 wherein said negative-resistance solid-state devices are tunnel diodes and are fabricated into alternate rungs only in said narrow sidewall of said waveguide sections.

4. A traveling-wave device as recited in claim 3 wherein all of said tunnel diodes in said array are polarized in the same direction.

5. A traveling-wave device as recited in claim 4 further comprising means connected to each of said tunnel diodes in said array for biasing said tunnel diodes into their negative conductance regions.

6. A traveling-wave device comprising:
(a) a rectangular waveguide section having two narrow sidewalls and two broad walls, each of said narrow side walls having a series of regularly spaced resonant windows and rungs; and
(b) two arrays of negative-resistance solid-state devices, each negative-resistance solid-state device of one array being fabricated into a separate rung in one of said narrow sidewalls and each negative-resistance solid-state device of the other array being fabricated into a separate rung in the other of said narrow sidewalls, each of said negative-resistance solid-state devices in both of said arrays carrying only a fractional portion of the total radio-frequency current flowing in said narrow sidewalls when said waveguide section is excited in the dominant transverse electric mode.

7. A traveling-wave device as recited in claim 6 wherein said negative-resistance solid-state devices are tunnel diodes and are fabricated into alternate rungs only in said narrow sidewalls of said waveguide section, said arrays being shifted spatially with respect to the other half the distance between two tunnel diodes in one array.

8. A traveling-wave device as recited in claim 7 wherein all of the tunnel diodes within an array are polarized in the same direction and the tunnel diodes in one array are polarized in the opposite direction of the polarization of the tunnel diodes in the other array.

9. A traveling-wave device as recited in claim 8 further comprising means connected to each of said tunnel diodes in both said arrays for biasing said tunnel diodes into their negative conductance regions.

10. A traveling-wave oscillator comprising:
- (a) a rectangular waveguide section having two narrow sidewalls and two broad walls;
- (b) at least one array of negative-resistance solid-state devices fabricated into a narrow side-wall at said waveguide section, each negative-resistance solid-state device of said array being positioned in said narrow sidewall to carry only a fractional portion of the total radio-frequency current flowing in said narrow sidewall when said waveguide section is excited in the dominant transverse electric mode; and
- (c) a rectangular shorting plate having dimensions equal to the interior cross-sectional dimensions of said waveguide section positioned in said waveguide section and closing one end thereof, said waveguide section thereby forming a quarter wavelength resonator.

11. A traveling-wave oscillator as recited in claim 10 wherein said rectangular shorting plate is mechanically slideable in said waveguide section to permit tuning said oscillator.

12. A traveling-wave oscillator as recited in claim 10 further comprising:
- (a) an electronically variable reactance connected between the broad walls of said waveguide section; and
- (b) means connected to said electronically variable reactance for varying the reactance thereof.

13. A traveling-wave oscillator as recited in claim 12 wherein said electronically variable reactance is a varactor diode.

References Cited by the Examiner

UNITED STATES PATENTS

| | | | |
|---|---|---|---|
| 3,160,826 | 12/1964 | Marcatili | 330—34 X |
| 3,171,086 | 2/1965 | Gerlach | 330—43 |
| 3,254,309 | 5/1966 | Miller | 331—107 X |

ROY LAKE, *Primary Examiner.*

NATHAN KAUFMAN, *Examiner.*

S. H. GRIMM, *Assistant Examiner.*